(12) United States Patent
Li et al.

(10) Patent No.: US 10,929,418 B2
(45) Date of Patent: Feb. 23, 2021

(54) SYSTEMS AND METHODS FOR FLEXIBLE STREAMING AGGREGATION FOR ELECTRONIC TRANSACTION ANALYSIS

(71) Applicant: WePay, Inc., Redwood City, CA (US)

(72) Inventors: Wei Li, Foster City, CA (US); Lakshman Shyam S. Maddali, Fremont, CA (US)

(73) Assignee: WePay, Inc., Redwood City, CA (US)

( * ) Notice: Subject to any disclaimer, the term of this patent is extended or adjusted under 35 U.S.C. 154(b) by 213 days.

(21) Appl. No.: 15/544,509

(22) PCT Filed: Feb. 24, 2017

(86) PCT No.: PCT/US2017/019534
§ 371 (c)(1),
(2) Date: Jun. 19, 2018

(87) PCT Pub. No.: WO2018/132118
PCT Pub. Date: Jul. 19, 2018

(65) Prior Publication Data
US 2018/0276299 A1  Sep. 27, 2018

Related U.S. Application Data

(60) Provisional application No. 62/445,132, filed on Jan. 11, 2017.

(51) Int. Cl.
*G06F 16/25* (2019.01)
*G06F 16/242* (2019.01)
(Continued)

(52) U.S. Cl.
CPC ........ *G06F 16/254* (2019.01); *G06F 16/2423* (2019.01); *G06F 16/951* (2019.01);
(Continued)

(58) Field of Classification Search
CPC .................................................... G06F 16/254
See application file for complete search history.

(56) References Cited

U.S. PATENT DOCUMENTS

2005/0228805 A1  10/2005  Britton et al.
2007/0233644 A1  10/2007  Bakalash et al.
(Continued)

OTHER PUBLICATIONS

PCT International Search Report and Written Opinion dated Oct. 16, 2017 in the International Application No. PCT/US2017/019534. 15 pages.

*Primary Examiner* — William Spieler
(74) *Attorney, Agent, or Firm* — Duane Morris LLP; Manita Rawat

(57) ABSTRACT

A new approach is proposed that contemplates systems and methods to support streaming aggregation for analysis of electronic transactions. First, a plurality of metrics to be measured/analyzed for a stream of real life events, such as processing steps of the electronic transactions are defined and converted to one or more generic metrics for aggregation. In some embodiments, the plurality of metrics flexibly include ad-hoc aggregation measures as well as various user-defined functions (UDFs), which allow a user/processor/evaluator of the electronic transactions to define and collect various types of information of the electronic transactions for analysis. Once converted, the generic metrics of the stream of real life events are aggregated by an aggregation engine in real time. The aggregation results are then saved in an aggregation database, which is queried by the user for real time analysis of the electronic transaction.

23 Claims, 4 Drawing Sheets

(51) Int. Cl.
*G06Q 20/22* (2012.01)
*G06F 16/951* (2019.01)
*G06Q 20/40* (2012.01)
*G06Q 20/38* (2012.01)
*G06Q 40/02* (2012.01)
*G06Q 20/00* (2012.01)

(52) U.S. Cl.
CPC ............ *G06Q 20/00* (2013.01); *G06Q 20/22* (2013.01); *G06Q 20/38* (2013.01); *G06Q 20/40* (2013.01); *G06Q 40/02* (2013.01)

(56) References Cited

U.S. PATENT DOCUMENTS

| | | |
|---|---|---|
| 2012/0330996 A1 | 12/2012 | Chang et al. |
| 2013/0262443 A1 | 10/2013 | Leida et al. |
| 2016/0179921 A1 | 6/2016 | Gupta et al. |

SYSTEMS AND METHODS FOR FLEXIBLE STREAMING AGGREGATION FOR ELECTRONIC TRANSACTION ANALYSIS

CROSS-REFERENCE TO RELATED AND CO-PENDING APPLICATIONS

This application is a U.S. national stage application under § 371 of International Patent Application No. PCT/US17/19534, filed Feb. 24, 2017, which claims the benefit of U.S. Provisional Patent Application No. 62/445,132, filed Jan. 11, 2017, and entitled "Flexible streaming aggregation pipeline," the entireties of each are expressly incorporated herein in its entirety by reference.

BACKGROUND

For electronic payment platforms/processors, the data of electronic payments/transactions are typically processed and stored in a relational transaction database such as MySQL, which can be accessed by SQL queries. When performing financial or fraud risk analysis for every electronic payment, an electronic payment processor makes a determination about whether the electronic payment is good or bad based on various information of the electronic payment retrieved from the same transaction database via a plurality of SQL queries. When the volume of the electronic transactions is small, the electronic payment processor is able to both process the electronic transactions and perform analysis of the electronic transactions at the same time. When the volume of the electronic transactions becomes increasingly large, however, the setup does not scale well and processing of the electronic transactions is slowed down by the queries initiated from the analysis.

One approach that has been adopted to address the problem above is to replicate the data of the electronic transactions from a master database to a slave database and to only run the queries for the analysis on the slave database instead of the master database where the electronic transactions are processed and saved. Although the approach alleviates the performance impact on electronic transaction processing caused by running the queries for the analysis on the same database, the analysis is based on delayed data in the slave database, which in some cases is not suitable for real time analysis of the electronic transactions. It is thus desirable to be able to enable real time processing of the electronic transactions while shortening the delay for the analysis of the transactions.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
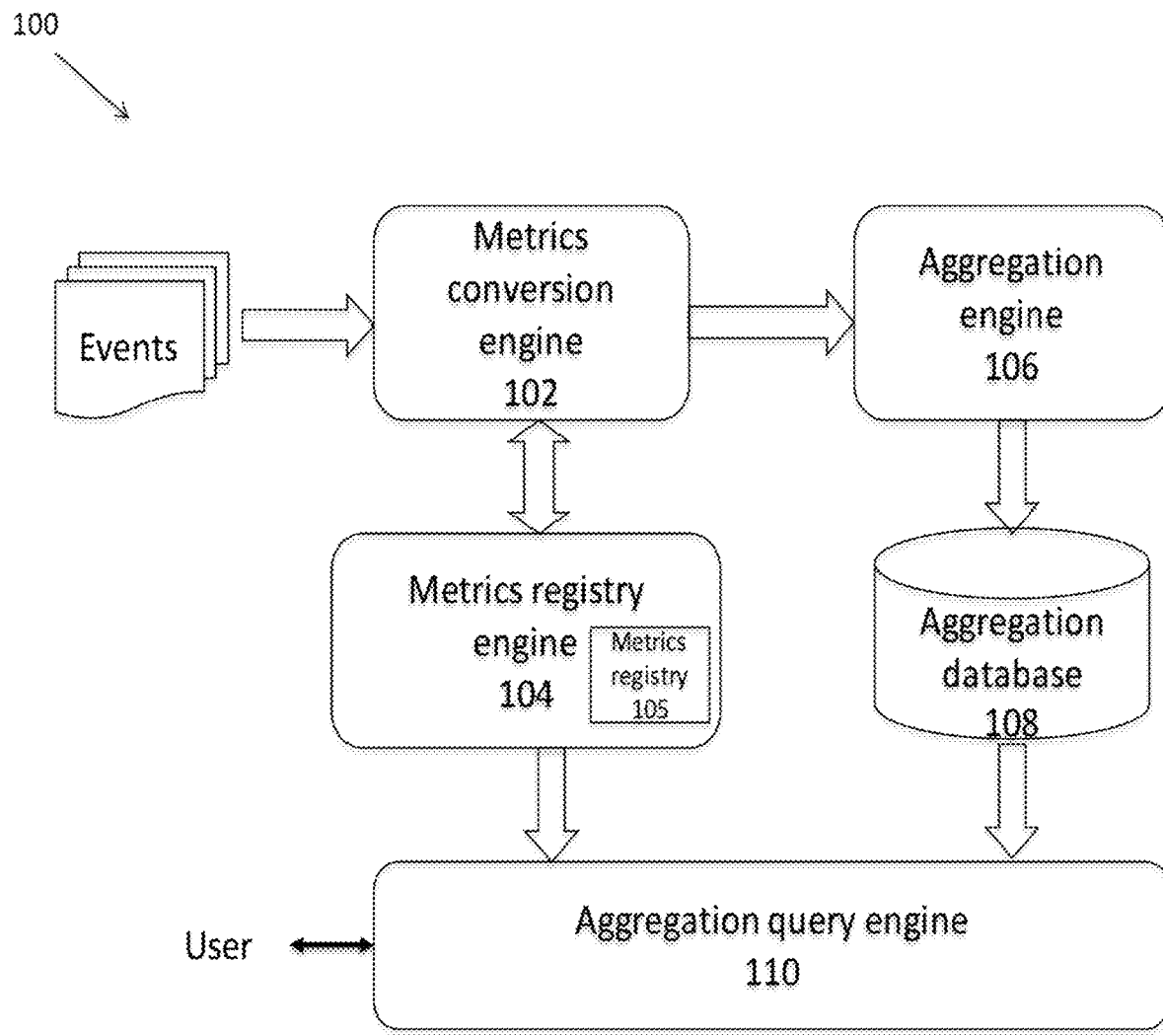
FIG. 1 depicts an example of a diagram of a system to support streaming aggregation for electronic transaction analysis in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support streaming aggregation for analysis of electronic transactions. First, a plurality of metrics to be measured/analyzed for a stream of real life events, such as processing steps of the electronic transactions, are defined and converted to one or more generic metrics for aggregation. In some embodiments, the plurality of metrics flexibly include ad-hoc aggregation measures as well as various user-defined functions (UDFs), which allow a user/processor/evaluator of the electronic transactions to define and collect various types of information of the electronic transactions for analysis. Once converted, the generic metrics of the stream of real life events are aggregated by an aggregation engine in real time. The aggregation results are then saved in an aggregation database, which is queried by the user for real time analysis of the electronic transaction.

The queries producing various aggregations are the most expensive ones in terms of time and computing resources used and are also the most frequently used queries for analysis of the electronic transactions. By moving these aggregations to a dedicated aggregation engine separate from the electronic transaction processing system, the proposed approach improves scalability and reduces latency of real time analysis of the electronic transactions without having any negative impact on the processing of the electronic transactions for business. In addition, the proposed approach supports flexible ad-hoc queries on par or close to SQL in nearly real-time in terms of aggregation functionalities, thus providing answers to the user at least down to the hour level or even finer granularity of time period (e.g., minute level). The approach also supports an extensible aggregation framework that allows new/user-defined aggregation functionalities to be included.

FIG. 1 depicts an example of a diagram of a system 100 to support streaming aggregation for electronic transaction analysis. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, wherein the multiple hosts can be connected by one or more networks.

In the example of FIG. 1, the system 100 includes at least a metrics conversion engine 102, a metrics registry engine 104, an aggregation engine 106, an aggregation database 108, and an aggregation query engine 110, each running on a computing unit/appliance/host (not shown) with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units of the computing unit, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits. Here, each host can be a computing device, a communication device, a storage device, or any computing device capable of running a software component. For non-limiting examples, a computing device can be but is not limited to a laptop PC, a desktop PC, a tablet PC, or an x86 or ARM-based a server running Linux or other operating systems. In some embodiments, each host has a communication interface (not shown), which enables the engines and/or the database running on the host to communicate with each other following certain communication protocols, such as TCP/IP, http, https, ftp, and sftp protocols, over one or more communication networks (not shown). The communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, the metrics conversion engine 102 accepts as its input a stream/plurality of real life events, e.g., database operations or processing steps captured in an electronic transaction, and generates a metric mapping path, which reflects a dimension, e.g., transaction, merchant, value, etc., of the electronic transaction to be measured and aggregated downstream. For a non-limiting example, the stream of real life events can be in the format of Kafka, which is an open-source transactional stream event processing format. The metrics conversion engine 102 then checks the metric mapping path against registered metric paths stored in a metrics registry 105 maintained by the metrics registry engine 104 to confirm the metric mapping path is valid and tagged with a final metric path. Once the metric mapping path is validated, the metric conversion engine 102 registers/adds the metric mapping path to the metrics registry 105. The metrics conversion engine 102 then converts the stream of real life events to one or more generic metrics and sends them to the aggregation engine 106 for aggregation.

In some embodiments, each of the generic metrics generated by the metrics conversion engine 102 includes one or more of: generation time, a dimension, and one or more metric values of the generic metric. The metrics conversion engine 102 also supports a plurality of customized/user-defined functions (UDFs) for "novice" and metric aggregation for each of a plurality of metric data types. These UDFs support "ad-hoc" aggregation requests and queries for investigation and analysis of abnormalities and/or unclarified areas in the electronic transactions, such as flow rate of the merchants, horizontal comparison among the merchants, et. Here, the UDFs for the metric data types include but are not limited to numerical, categorical, domain-specific/extensible types, and other additional transformations on the metric values. Specifically, the UDFs for the numerical data type can include, for non-limiting examples, sum, average, max, min, count, variance, top, etc., of the metric values; the UDFs for the categorical data type can include, for a non-limiting example, unique/distinct metric values with occurrence count for each of the values, etc.; and the UDFs for the extensible type can include, for non-limiting examples, geo location (e.g., latitude, longitude), zip code distribution, location proximity, etc. In some embodiments, the UDFs are extensible on demand per aggregation request at runtime.

In the example of FIG. 1, the metrics registry engine 104 is configured to maintain and look up the metrics registry 105, which includes an inventory of metadata of a plurality of metrics to be aggregated by the aggregation engine 106 to ensure that the dimension and values of a metric mapping path from the metrics conversion engine 102 are valid and unique. For a non-limiting example, if a user has already provided a metric with a dimension for "revenue" and numeric value, other users cannot use the same dimension name for a different purpose. In some embodiments, the metadata of the metrics is organized and stored in the metrics registry 105 in a tree-like graph structure, wherein the metadata in the tree-like graph structure includes a path of dimensions and names for the metrics as well as data types and UDFs of the metrics. The metrics registry engine 104 may then utilize the metadata to validate the metric mapping path in response to a metric mapping path lookup request from the metrics conversion engine 102 as discussed above. The metrics registry engine 104 is also configured to provide guidance to users on how to explore the aggregation results stored in the aggregation database 108 discussed below.

Figure 2A:
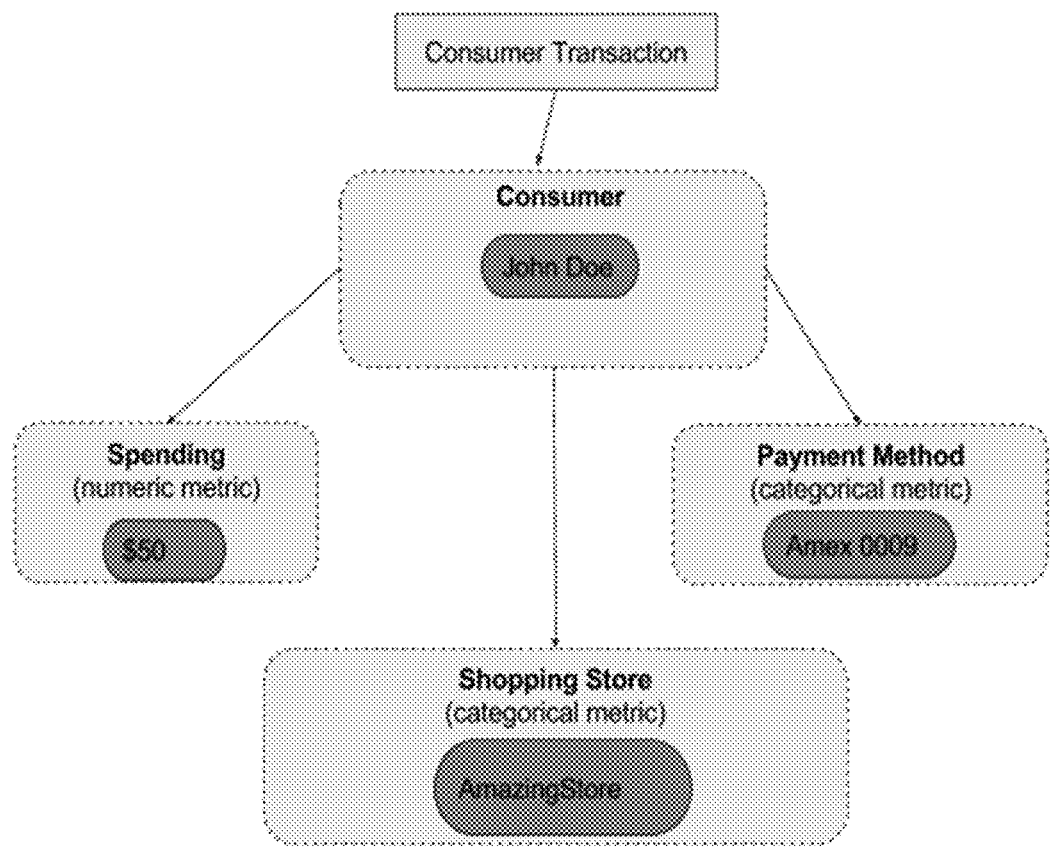
FIGS. 2A and 2B depict examples of tree-like structures of an electronic transaction in the metrics registry in accordance with some embodiments.

The following is a non-limiting example to illustrate how the system 100 depicted in FIG. 1 can be applied to a consumer spending event. In the example, consumer John Doe ordered $50 worth of goods online from AmazingStore.com and paid the purchase with his Amex card ending 0009 on Dec. 28, 2016 20:12:12 PST. One exemplary tree-like structure of this particular event/electronic transaction in the metrics registry 105 is shown in the example depicted in FIG. 2A where data types of the metric values are shown for each leaf node. Under this metrics registry set up, there are three dimensions of generic metrics, each reflecting a registered metric path in the metrics registry 105. The following table shows the three dimensions, their corresponding metric values, and the metric aggregation functions that can be applied to each of the dimensions.

| Metric | Time | Dimension | Metric value | Metric Function |
|---|---|---|---|---|
| 1 | Dec. 28, 2016 20:12:12 PST | Consumer{JohnDoe}.Spending | 50 | Numeric function Sum, average, min, max, count, variance, . . . |

| Metric | Time | Dimension | Metric value | Metric Function |
|---|---|---|---|---|
| 2 | Dec. 28, 2016 20:12:12 PST | Consumer{JohnDoe}.PaymentMethod | Amex 0009 | Categorical, unique value, etc. |
| 3 | Dec. 28, 2016 20:12:12 PST | Consumer{JohnDoe}.ShoppingStore | AmazingStore | Categorical, unique value, etc. |

Figure 2B:
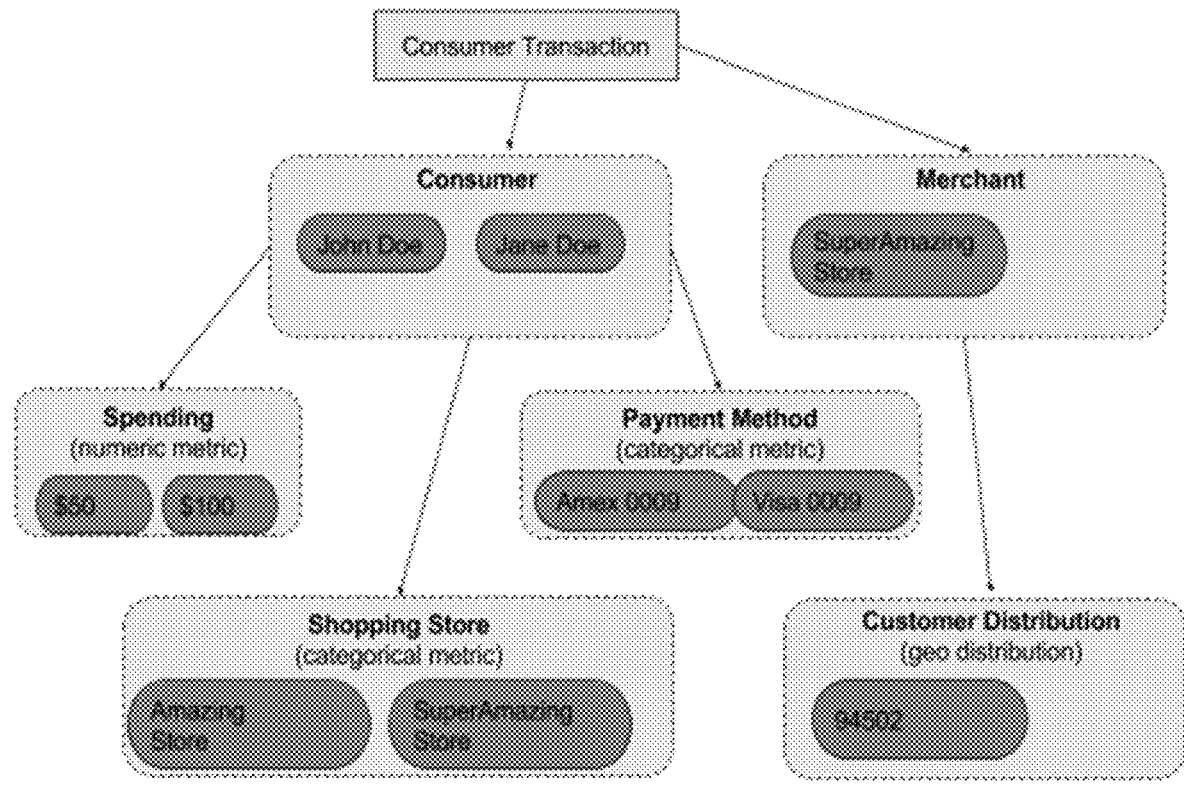

In another non-limiting example, geo location information about a spending event is also included, where consumer Jane Doe ordered $100 worth of goods from SuperAmazingOnlineStore and paid with her Visa card ending 0009 on Jan. 8, 2017 20:12:12 PST from an area with zip code 94502. With more information collected from the event, more metrics can be generated. For example, the user (electronic payment processor) may want to start from a merchant's perspective to track the geo distribution of the customers. As such, the metrics registry 105 can be augmented to include additional paths and dimensions of the newly added electronic transaction as shown in the example depicted in FIG. 2B. Under this augmented metrics registry, there are at least four dimensions of generic metrics, each reflecting a registered metric path in the metrics registry 105. The following table shows the four dimensions, their corresponding metric values, and the metric aggregation functions that can be applied to each of the dimensions.

various granularities/granular levels including every minute, hour, day, week, etc., with the minute level aggregation having the lowest latency and the hour level, the day level and the week level having longer latency in that order. The aggregation engine 106 may further group and aggregate the metrics of the events in the same aggregation time window by various metric dimensions, such as by merchants, number of transactions, transaction values, etc. In some embodiments, the aggregation engine 106 supports a customized time window where metrics within the customized time window are summed together. In some embodiments, multiple instances of the aggregation engine 106 can be instituted to handle a plurality of partitions of the metrics of the events for scalability. In some embodiments, different instances of the aggregation engine 106 can be dedicated to aggregate metrics within time windows of different granularities.

| Metric | Time | Dimension | Metric value | Metric Function |
|---|---|---|---|---|
| 1 | Jan. 8, 2017 20:12:12 PST | Consumer{JaneDoe}.Spending | 100 | Numeric function Sum, average, min, max, count, variance, . . . |
| 2 | Jan. 8, 2017 20:12:12 PST | Consumer{JaneDoe}.PaymentMethod | Visa 0009 | Categorical, unique value, etc. |
| 3 | Jan. 8, 2017 20:12:12 PST | Consumer{JaneDoe}.ShoppingStore | SuperAmazing Store | Categorical, unique value, etc. |
| 4 | Jan. 8, 2017 20:12:12 PST | Merchant{SuperAmazingStore}.Customer Distribution | 94502 | Geo distribution |

In the example of FIG. 1, the aggregation engine 106 is configured to accept and aggregate metric values of various dimensions of the generic metrics of the events according to various metric aggregation functions based on the data types discussed above. In some embodiments, the aggregation engine 106 is configured to generate histogram information for each of the data types. Since the events have been converted to generic metrics, the aggregation engine 106 can perform automatic aggregation on the data types of the generic metrics of the events without any change or adjustment to the code and/or configuration of the aggregation engine 106 itself. In some embodiments, the aggregation engine 106 is configured to group and aggregate the generic metrics of the events within one or more specified aggregation time windows for time-based metrics based on the metric generated time, e.g., the number of transactions authorized by a particular merchant within a five minute window. Here, the aggregation time windows can be of The aggregation engine 106 then outputs and saves aggregation results in the form of calculated stats to the underlying aggregation database 108 on a persistent storage according to the metric mapping path pre-registered/validated by the metrics registry engine 104. Note that different dimensions that correspond to different metric mapping paths can be saved at different locations of the aggregation database 108. In some embodiments, the aggregation results are stored by time window size, e.g., minute, hour, etc. In some embodiments, the aggregation engine 106 can be implemented on a streaming and batch processing platform such as Google Cloud Dataflow, which is a data processing service supporting both stream and batch execution of pipelines as well as parallel processing. The aggregation database 108 can be implemented via, for a non-limiting example, Google Cloud Big Table.

In the example of FIG. 1, the aggregation query engine 110 is configured to inquire the metrics registry engine 104 about metadata of various types of metrics that have been registered in the metrics registry 105 and thus are supported for aggregation by the system 100. For a specific dimension of the generic metrics that is supported for aggregation by the system 100, the aggregation query engine 110 is configured to query and retrieve from the aggregation database 108 the aggregation results for the metric generated by the aggregation engine 106 within a certain time period/range via, for a non-limiting example, one or more Application Program Interfaces (APIs). In some embodiments, the aggregation query engine 110 is configured to stitch together aggregation results from time windows of different granularities within a time period as the final answer to the user's inquiry.

Figure 3:
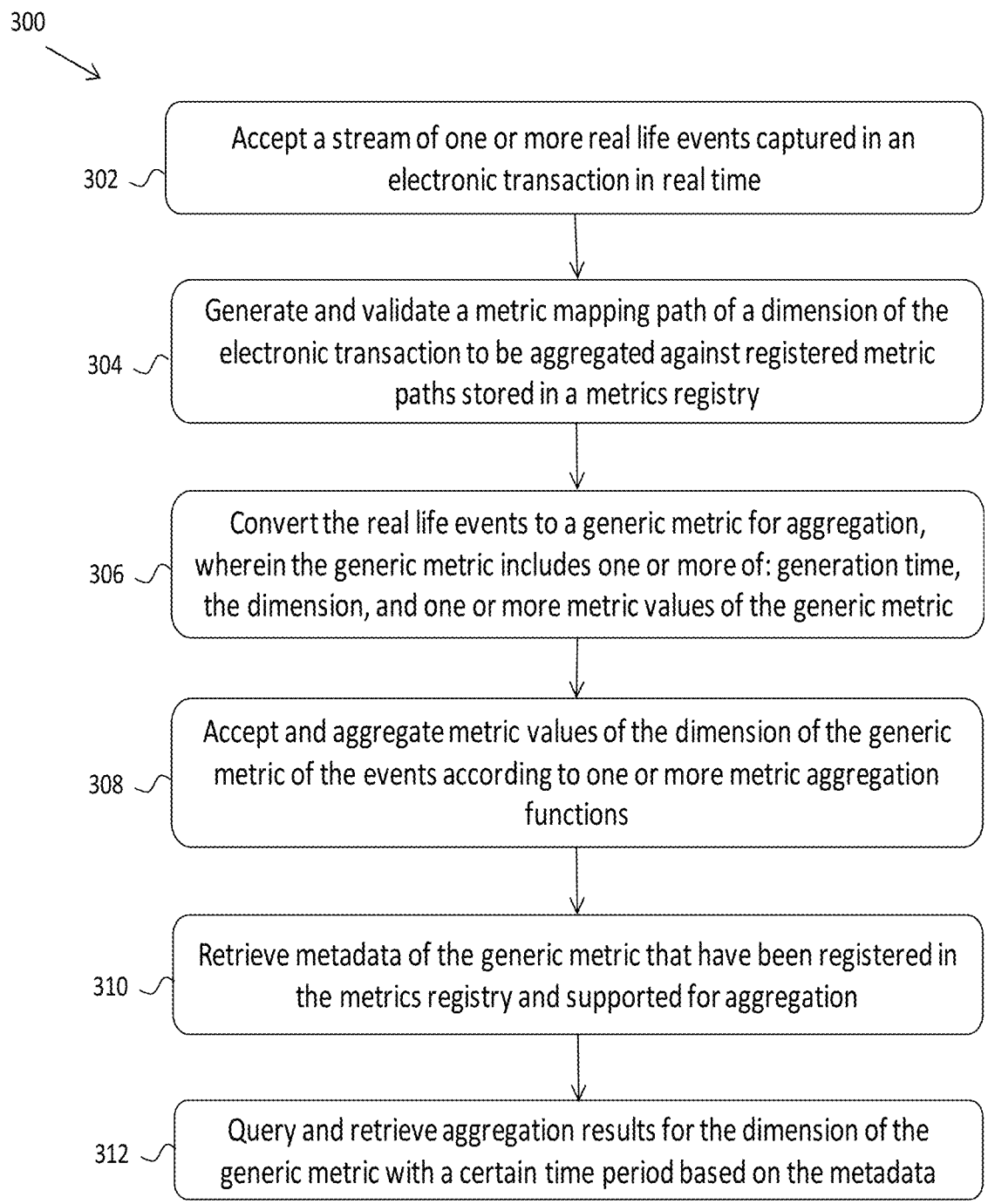
FIG. 3 depicts an example of a flowchart of a process to support streaming aggregation for electronic transaction analysis in accordance with some embodiments.

FIG. 3 depicts an example of a flowchart of a process to support streaming aggregation for electronic transaction analysis. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where a stream of one or more real life events captured in an electronic transaction in real time are accepted by a metric conversion engine. The flowchart 300 continues to block 304, where a metric mapping path of a dimension of the electronic transaction to be aggregated is generated and validated against registered metric paths stored in a metrics registry. The flowchart 300 continues to block 306, where the real life events are converted to a generic metric for aggregation, wherein the generic metric includes one or more of: generation time, the dimension, and one or more metric values of the generic metric. The flowchart 300 continues to block 308, where metric values of the dimension of the generic metric of the events are accepted and aggregated according to one or more metric aggregation functions. The flowchart 300 continues to block 310, where metadata of the generic metric that have been registered in the metrics registry and supported for aggregation is retrieved. The flowchart 300 ends at block 312, where aggregation results for the dimension of the generic metric with a certain time period are queried and retrieved based on the metadata.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support streaming aggregation for electronic transaction analysis, comprising:
    a metrics conversion engine running on a host, which in operation, is configured to:
        accept as its input a stream of one or more real life events captured in an electronic transaction in real time;
        generate and validate a metric mapping path of a dimension of the electronic transaction to be aggregated against registered metric paths stored in a metrics registry; and
        convert the real life events to a generic metric for aggregation, wherein the generic metric includes one or more of: generation time, the dimension, and one or more metric values of the generic metric;
    an aggregation engine running on a host, which in operation, is configured to accept and aggregate metric values of the dimension of the generic metric of the events according to one or more metric aggregation functions;
    an aggregation query engine running on a host, which in operation, is configured to:
        retrieve metadata of the generic metric that have been registered in the metrics registry and supported for aggregation; and
        query and retrieve aggregation results for the dimension of the generic metric with a certain time period based on the metadata; and
    a metrics registry engine running on a host which in operation, is configured to:
        maintain an inventor of metadata of a plurality of generic metrics to be aggregated in said metrics registry;
        receive a metric mapping path lookup request from the metrics conversion engine for the metric mapping path of the dimension of the electronic transaction to be aggregated against registered metric paths stored in the metrics registry; and
        determine that the metric mapping path is valid and unique based on the dimension of the electronic transaction to be aggregated and the registered metric paths stored in the metrics registry.

2. The system of claim 1, further comprising:
an aggregation database configured to maintain the aggregation results in the form of calculated stats on a persistent storage according to the validated metric mapping path, wherein different dimensions that correspond to different metric mapping paths are saved at different locations of the aggregation database.

3. The system of claim 1, wherein:
the metrics conversion engine is configured to register the metric mapping path to the metrics registry once the metric mapping path is validated.

4. The system of claim 1, wherein:
the metrics conversion engine is configured to support a plurality of user-defined metric aggregation functions (UDFs) for each of a plurality of metric data types, wherein the UDFs for the metric data types include numerical, categorical, domain-specific, and other transformation of the metric values.

5. The system of claim 4, wherein:
the UDFs are extensible on demand per aggregation request at runtime.

6. The system of claim 4, wherein:
the aggregation engine is configured to perform automatic aggregation on the data types of the generic metric of the events without any change or adjustment to the code and/or configuration of the aggregation engine itself.

7. The system of claim 1,
wherein the metrics registry is configured to store the aggregation results in the aggregation database by a time window size.

8. The system of claim 7, wherein:
the metrics registry engine is configured to:
organize and store metadata of the metrics in the metrics registry in a tree-like graph structure; and
look up a path in the tree-like graph structure to validate the metric mapping path.

9. The system of claim 1, wherein:
the aggregation engine is configured to group and aggregate the generic metric of the events within one or more specified aggregation time windows based on the metric generated time.

10. The system of claim 9, wherein:
the aggregation time windows are of various granularities including every minute, hour, day, week, etc., with the minute level aggregation having the lowest latency and the hour level, the day level and the week level having longer latency in that order.

11. The system of claim 9, wherein:
the aggregation engine is configured to group and aggregate generic metrics of the events in the same aggregation time window by various metric dimensions.

12. The system of claim 9, wherein:
the aggregation query engine is configured to stitch together aggregation results from the aggregation time windows of different granularities within a time period as the final answer to a user's inquiry.

13. A computer-implemented method to support streaming aggregation for electronic transaction analysis, comprising:
accepting a stream of one or more real life events captured in an electronic transaction in real time;
generating and validating a metric mapping path of a dimension of the electronic transaction to be aggregated against registered metric paths stored in a metrics registry;
converting the real life events to a generic metric for aggregation, wherein the generic metric includes one or more of: generation time, the dimension, and one or more metric values of the generic metric;
accepting and aggregating metric values of the dimension of the generic metric of the events according to one or more metric aggregation functions;
retrieving metadata of the generic metric that have been registered in the metrics registry and supported for aggregation;
querying and retrieving aggregation results for the dimension of the generic metric with a certain time period based on the metadata;
maintaining an inventory of metadata of a plurality of genetic metrics to be aggregated in said metrics registry;
receiving a metric mapping path lookup request for the metric mapping path of the dimension of the electronic transaction to be aggregated against registered metric paths stored in the metrics registry; and
determining that the metric mapping path is valid and unique based on the dimension of the electronic transaction to be aggregated and the registered metric paths stored in the metrics registry.

14. The computer-implemented method of claim 13, further comprising:
maintaining the aggregation results in the form of calculated stats on a persistent storage according to the validated metric mapping path, wherein different dimensions that correspond to different metric mapping paths are saved at different locations of the aggregation database.

15. The computer-implemented method of claim 13, further comprising:
registering the metric mapping path to the metrics registry once the metric mapping path is validated.

16. The computer-implemented method of claim 13, further comprising:
supporting a plurality of user-defined metric aggregation functions (UDFs) for each of a plurality of metric data types, wherein the UDFs for the metric data types include numerical, categorical, domain-specific, and other transformation of the metric values, and wherein the UDFs are extensible on demand per aggregation request at runtime.

17. The computer-implemented method of claim 16, further comprising:
performing automatic aggregation on the data types of the generic metric of the events without any change or adjustment to the code and/or configuration of the aggregation engine itself.

18. The computer-implemented method of claim 13, further comprising
storing the aggregation results in the aggregation database by a time window size.

19. The computer-implemented method of claim 18, further comprising:
organizing and storing metadata of the metrics in the metrics registry in a tree-like graph structure; and
looking up a path in the tree-like graph structure to validate the metric mapping path.

20. The computer-implemented method of claim 13, further comprising:

grouping and aggregating the generic metric of the events within one or more specified aggregation time windows based on the metric generated time, wherein the aggregation time windows are of various granularities including every minute, hour, day, week, etc., with the minute level aggregation having the lowest latency and the hour level, the day level and the week level having longer latency in that order.

21. The computer-implemented method of claim 20, wherein:

grouping and aggregating generic metrics of the events in the same aggregation time window by various metric dimensions.

22. The computer-implemented method of claim 20, wherein:

stitching together aggregation results from the aggregation time windows of different granularities within a time period as the final answer to a user's inquiry.

23. A non-transitory computer readable storage medium having software instructions stored thereon that when executed cause a system to:

accept a stream of one or more real life events captured in an electronic transaction in real time;

generate and validate a metric mapping path of a dimension of the electronic transaction to be aggregated against registered metric paths stored in a metrics registry;

convert the real life events to a generic metric for aggregation, wherein the generic metric includes one or more of: generation time, the dimension, and one or more metric values of the generic metric;

accept and aggregate metric values of the dimension of the generic metric of the events according to one or more metric aggregation functions;

retrieve metadata of the generic metric that have been registered in the metrics registry and supported for aggregation;

query and retrieve aggregation results for the dimension of the generic metric with a certain time period based on the metadata;

maintain an inventory of metadata of a plurality of generic metrics to the aggregated in said metrics registry;

receive a metric mapping path lookup request for the metric mapping path of the dimension of the electronic transaction to be aggregated against registered metric paths stored in the metrics registry; and determine that the metric mapping path is valid and unique based on the dimension of the electronic transaction to be aggregated and the registered metric paths stored in the metrics registry.

* * * * *